United States Patent [19]

Shimizu et al.

[11] Patent Number: 5,770,166
[45] Date of Patent: Jun. 23, 1998

[54] SLURRY THICKENING TANK AND ABSORPTION TOWER FOR USE IN WET FLUE GAS DESULFURIZATION SYSTEMS

[75] Inventors: Taku Shimizu; Koichiro Iwashita; Yoshikazu Endo, all of Tokyo; Masakazu Onizuka; Toru Takashina, both of Hiroshima-ken, all of Japan

[73] Assignee: Mitsubishi Jukogyo Kabushiki Kaisha, Tokyo, Japan

[21] Appl. No.: 630,687

[22] Filed: Apr. 12, 1996

[30] Foreign Application Priority Data

May 26, 1995 [JP] Japan ..................................... 7-128312

[51] Int. Cl.$^6$ .................. B01D 50/00; B01J 8/08
[52] U.S. Cl. .................. 422/172; 422/177; 422/219; 55/228
[58] Field of Search .................. 422/172, 177, 422/219; 423/243.01, 243.08, 244.07; 55/228

[56] References Cited

U.S. PATENT DOCUMENTS

| | | | |
|---|---|---|---|
| 3,852,040 | 12/1974 | Gustavsson | 23/284 |
| 4,120,791 | 10/1978 | Wright | 210/84 |
| 4,273,658 | 6/1981 | Karman | 210/709 |
| 5,034,028 | 7/1991 | Ukawa et al. | 55/73 |
| 5,132,027 | 7/1992 | Ukawa et al. | 210/787 |
| 5,266,286 | 11/1993 | Ukawa et al. | 423/243.08 |
| 5,340,547 | 8/1994 | Moser et al. | 422/177 |
| 5,486,341 | 1/1996 | Bresowar | 423/243.01 |
| 5,558,848 | 9/1996 | Moser et al. | 423/243.01 |
| 5,605,552 | 2/1997 | Shimizu et al. | 55/228 |

FOREIGN PATENT DOCUMENTS

| | | |
|---|---|---|
| A 0 437 941 | 11/1975 | Belgium . |
| 0 017 348 A1 | 10/1980 | European Pat. Off. . |
| 0 437 941 A1 | 7/1991 | European Pat. Off. . |
| 0 682 972 A2 | 5/1995 | European Pat. Off. . |
| 3430960 A1 | 2/1986 | Germany . |
| 07308539A | 11/1995 | Japan . |

*Primary Examiner*—Nina Bhat
*Attorney, Agent, or Firm*—Bell Seltzer Intellectual Property Law Group; Alston & Bird LLP

[57] ABSTRACT

The present invention relates to a slurry thickening tank comprising a tank body disposed below the surface of a slurry within a slurry tank, a slurry inlet provided in the upper part of the tank body, a thickened slurry outlet provided in the lower part of the tank body, and supernatant liquid withdrawal means provided in the upper part of the tank body, whereby the slurry introduced into the tank body through the slurry inlet is thickened by sedimentation in the tank body and the resulting thickened slurry is discharged from the tank body through the slurry outlet, wherein the surface of the structural member of the tank body extending from the slurry inlet to the thickened slurry outlet has an angle of inclination greater than the angle of repose for the thickened slurry, and to an absorption tower for use in flue gas desulfurization systems which is equipped with such a slurry thickening tank. This slurry thickening tank can maintain satisfactory operating conditions for a long period of time without developing any trouble such as a blockage of the thickened slurry outlet.

6 Claims, 6 Drawing Sheets

SLURRY THICKENING TANK AND ABSORPTION TOWER FOR USE IN WET FLUE GAS DESULFURIZATION SYSTEMS

BACKGROUND OF THE INVENTION

1. Field of the Invention

This invention relates to a slurry thickening tank for thickening a slurry by sedimentation of solid particles contained therein, and an absorption tower which is equipped with such a slurry thickening tank and is suitable for use in flue gas desulfurization systems based on the wet lime-gypsum process.

2. Description of the Related Art

As an example, a conventional method for thickening a gypsum slurry and separating gypsum in flue gas desulfurization systems based on the wet lime-gypsum process (hereinafter referred to simply as flue gas desulfurization systems) is described below. As will be detailed later in the description of embodiments, these flue gas desulfurization systems produce a slurry having a gypsum content of about 20–30% by weight in an absorption tower or the like. After this slurry is separated into gypsum (in the form of fine particles having a mean particle size of about 40 $\mu$m) and a liquid, the gypsum is recovered as a by-product while most of the liquid is recycled to the absorption tower.

In conventional flue gas desulfurization systems, the thickening of a slurry and the dehydration of gypsum have been effected by the combined use of a slurry thickening tank, called a gypsum thickener, and a centrifugal separator. The gypsum thickener is a kind of sedimentation tank for separating the slurry into a thickened slurry and a supernatant liquid (i.e., a gravity separation tank utilizing a difference in specific gravity). In this connection, the specific gravity of gypsum is 2.32 whereas that of water is 1.0. In this thickener, the slurry is thickened to a gypsum content of about 60% by weight. In the centrifugal separator, the thickened slurry resulting from the thickener is subjected to solid-liquid separation under the action of centrifugal force. The gypsum dehydrated by the centrifugal separator has a water content of about 5% by weight.

More specifically, the thickener is not a simple tank, but is equipped with a feed well for dispersing the fed slurry gently and distributing it throughout the tank, as well as a rake rotating at a low speed to collect the deposited gypsum around the slurry withdrawal port located at the center of the tank bottom, and a driving mechanism therefor. Moreover, from the viewpoint of corrosion resistance, various parts of the thickener are lined with rubber or resin, or made of a corrosion-resistant material such as stainless steel.

The centrifugal separator is composed of a fixed outer casing, a fast-rotating basket and a driving mechanism therefor, a filter medium, a scraping device and the like. The outer casing is usually lined with rubber, and the basket is often made of stainless steel and may be lined with rubber according to the properties of the liquid. As the filter medium, a stainless steel wire net covered with a woven fabric of polypropylene or the like is often used. The scraping device, which is used to scrape off the dehydrated gypsum from the basket, comprises a stainless steel member having a surface-hardened edge.

The above-described conventional gypsum slurry treating system is very large in scale and expensive. Accordingly, it requires a large floor space and a great equipment cost. Especially in the case of simplified flue gas desulfurization systems adapted for use in developing countries, it is most desirable to reduce the cost of the equipment. Moreover, where a flue gas desulfurization system is subsequently added to an electric power plant which has already been in operation, it is desired to minimize the floor space requirements of the flue gas desulfurization system because of the limited available space.

In order to provide an economical simplified flue gas desulfurization system in response to these needs, the present inventors previously proposed the addition of a thickening tank to an absorption tower for use in flue gas desulfurization systems (Japanese Patent Provisional Publication No.7-308539/1995). FIG. 3 is a schematic sectional view illustrating the construction of the absorption tower for use in flue gas desulfurization systems which is described in Japanese Patent Provisional Publication No. 7-308539/1995.

The absorption tower 60 illustrated in FIG. 3 is a single upright tower-like structure comprising a combination of a lower storage tank 18, an absorption section 20 disposed thereover, and a chimney 22 disposed thereover. On the outside of the structure, an annular absorbent silo 24 (hereinafter referred to simply as the silo) is disposed in a position between the absorption section 20 and the chimney 22.

The lower part of the absorption section 20 is provided with a flue gas inlet port 25, through which flue gas 23 is introduced into the absorption section 20 and flows upward in the absorption section 20. In the lower part of the absorption section 20, a plurality of absorbent slurry injection nozzles 26 for injecting an absorbent slurry (or absorbing fluid) 27 are disposed on a single-stage header 28 in such a way that they are substantially uniformly distributed in a horizontal plane. These nozzles 26 are attached with their orifices facing upward and serve to inject the absorbent slurry upward.

An absorbent is withdrawn from the overlying silo 24 by means of a feeder 30 and fed to the lower storage tank 18 through a single pipeline. On the other hand, powdered limestone is conveyed from a limestone storage tank (not shown) to the silo 24 by means of a conventional pneumatic conveying means 32.

The storage tank 18 comprises a single tank which is divided by a partition 34 into a gypsum slurry tank (or absorbing fluid tank) 36 and a gypsum slurry thickening tank (hereinafter referred to simply as the thickening tank) 38. The gypsum slurry tank 36 is provided with an air nozzle 40 for injecting air into the stagnant gypsum slurry and thereby agitating it. This serves to prevent gypsum particles contained in the gypsum slurry from settling and also to oxidize the absorbed sulfurous acid into sulfuric acid.

Moreover, a slurry pump 41 is installed in a pipeline connecting the gypsum slurry tank 36 to the nozzle header 28, so that the gypsum slurry is fed from the gypsum slurry tank 36 to the nozzle header 28 in a circulating manner.

The partition 34 has an opening 42 formed in an appropriate place thereof, so that the gypsum slurry within the gypsum slurry tank 36 can flow into the gypsum slurry thickening tank 38 through the opening 42. The thickening tank 38 is a tank having a volume sufficient to secure the residence time required to thicken the gypsum slurry by natural sedimentation.

The gypsum slurry thickening tank 38 is provided with an outlet 46 in the lower part thereof, through which the thickened gypsum slurry is discharged onto a conveying means (e.g., a belt conveyor) 48. Moreover, in order to regulate the degree of thickening, an air inlet 44 for supplying air 39 communicates with the gypsum slurry tank 36.

A mixer (not shown) is installed at the front end of the conveying means 48. In this mixer, the thickened gypsum slurry is mixed with coal ash dropping from a coal ash storage tank (not shown), so that the thickened gypsum slurry loses its fluidity and comes to be in a state handleable with an ordinary belt conveyor.

At the top of the chimney 22, a mist catcher 50 for trapping mist present in the outgoing treated flue gas 55 is provided. This mist catcher 50 is a well-known mist catcher of the spiral flow type. The trapped mist spontaneously falls from the mist catcher 50 and is captured by the absorbent slurry 27 injected into the absorption section 20. The apparatus illustrated in this figure can remove $SO_2$ gas contained in flue gas at a degree of desulfurization of about 70–90%.

As soon as the absorbent slurry 27 injected upward from the nozzles 26 reaches a certain height, it begins to fall downward, comes into mutual collision in the course of falling to form fine droplets, and then flows into the gypsum slurry tank 36 below the absorption section 20. $SO_2$ gas contained in the flue gas reacts with lime present in the absorbent slurry to produce calcium sulfate (i.e., gypsum) and thereby form a gypsum slurry. The slurry containing unreacted lime and gypsum falls into the gypsum slurry tank 36. Then, the gypsum slurry flows into the gypsum slurry thickening tank 38 through the opening 42 and is thickened therein.

A test apparatus having a construction similar to that of the gypsum slurry thickening tank included in the absorption tower of FIG. 3 was made, and a slurry thickening test was carried out by using it. As a result, it was found that the problem of a blockage of the thickened slurry outlet 46 arose. Specifically, when the bottom 53 of the gypsum slurry thickening tank 38 is flat as shown in FIG. 4, a mass of gypsum accumulates on the bottom of the gypsum slurry thickening tank 38 as shown in this figure. In this situation, the thickened slurry flows through a narrow thickened slurry passage 52 formed between the accumulated mass of gypsum 51 and the tank body, and is discharged from the outlet 46.

However, if the accumulated mass of gypsum 51 grows gradually to the right side of the figure and the angle of inclination of its slanting surface exceeds the angle of repose for the mass of gypsum, a right end portion of the accumulated mass of gypsum 51 may crumble down into the thickened slurry passage 52 by some chance. Then, the outlet 46 is blocked up and the thickened slurry cannot be discharged. In the worst case, a large-scale operation comprising shutdown of the whole absorption tower, withdrawal of the slurry and removal of the blockage is required.

SUMMARY OF THE INVENTION

It is an object of the present invention to provide a slurry thickening tank which can maintain satisfactory operating conditions for a long period of time without developing any trouble such as a blockage of the thickened slurry outlet.

It is another object of the present invention to provide a low-cost and space-saving absorption tower for use in flue gas desulfurization systems which has such a slurry thickening tank and is especially suitable for use in simplified flue gas desulfurization systems.

According to a first aspect of the present invention, there is provided a slurry thickening tank comprising a tank body disposed below the surface of a slurry within a slurry tank, a slurry inlet provided in the upper part of the tank body, a thickened slurry outlet provided in the lower part of the tank body, and supernatant liquid withdrawal means provided in the upper part of the tank body, whereby the slurry introduced into the tank body through the slurry inlet is thickened by sedimentation in the tank body and the resulting thickened slurry is discharged from the tank body through the slurry outlet, wherein the surface of the structural member of the tank body extending from the slurry inlet to the thickened slurry outlet has an angle of inclination greater than the angle of repose for the thickened slurry.

In the above-described slurry thickening tank, the surface of the structural member of the tank body extending from the slurry inlet to the thickened slurry outlet is designed to have an angle of inclination greater than the angle of repose for the thickened slurry. More specifically, the side plate disposed within the slurry tank and constituting the part of the slurry thickening tank extending from the position of the slurry inlet to the thickened slurry outlet is formed of a plate having an angle of inclination which is substantially greater than the angle of repose for the thickened slurry. However, this angle of inclination need not necessarily be constant from the slurry inlet to the thickened slurry outlet, but may vary so that the side plate includes an upright part or a gently sloping part. What is essential is that the parts on which the thickened slurry tends to stagnate or deposit should be formed so as to have an angle of inclination greater than the angle of repose. Alternatively, the side plate may be formed in such a way that part or all of it has a curved surface. Owing to this structure, there is no place where the thickened slurry stagnates or deposits to form an accumulated mass of gypsum. Consequently, there occurs no phenomenon in which a crumbling of the accumulated mass of gypsum causes a blockage of the thickened slurry outlet.

In one preferred embodiment of the slurry thickening tank in accordance with the first aspect of the present invention, the aforesaid slurry inlet comprises one or more holes or a slit made in an upright or overhanging wall member forming part of the tank body.

The accumulation of a mass of gypsum which may cause a blockage of the thickened slurry outlet will occur on any flat surface, whether it is located in the slurry thickening tank or in the slurry tank. If such a mass of gypsum deposits or accumulates in or around the slurry inlet of the slurry thickening tank, it may cause a blockage of the slurry inlet. Accordingly, the slurry inlet is formed in a wall which is upright or overhanging (i.e., projecting slantingly like a pent roof). Thus, a mass of gypsum will neither accumulate in the slurry inlet nor fall off and run into the slurry inlet, so that the slurry inlet is prevented from being blocked up.

In another preferred embodiment of the slurry thickening tank in accordance with the first aspect of the present invention, the aforesaid supernatant liquid withdrawal means comprises an air-lift mechanism composed of a pipeline extending from the upper part of the tank body to a position above the slurry tank, and gas stream forming means for producing an upward stream of gas in the pipeline.

The slurry within the slurry tank enters the slurry thickening tank through the slurry inlet. In the slurry thickening tank, the high-density solid component of the slurry settles down while the low-density liquid component thereof rises to form a supernatant liquid. Thus, the slurry is thickened by sedimentation, so that a thickened slurry enriched with solid matter accumulates at the bottom of the slurry thickening tank and a layer of supernatant liquid is produced in the upper part of the slurry thickening tank. The resulting thickened slurry is discharged from the slurry thickening tank through the thickened slurry outlet, while the supernatant liquid is withdrawn from the slurry thickening tank by the supernatant liquid withdrawal means. Then, a corresponding volume of the slurry flows into the tank body through the slurry inlet and the same sedimentation thickening phenomenon is continued.

The supernatant liquid withdrawal means of the slurry thickening tank in accordance with the above-described preferred embodiment comprises an air-lift mechanism. Specifically, the upper part of the tank body in which the supernatant liquid is present is connected to a gaseous phase above the surface of the slurry within the slurry tank by means of a pipeline. If some upward driving force acts on this pipeline, the supernatant liquid within the slurry thickening tank will be delivered to a space above the slurry tank. This driving force is created by gas stream forming means for producing an upward stream of gas in the pipeline. As a result of attraction by this upward stream of gas, and also of a draft caused by the difference in specific gravity between the gas and the slurry within the pipeline, the supernatant liquid present in the upper part of the slurry thickening tank is driven upward and delivered to a space above the surface of the slurry within the slurry tank.

This supernatant liquid withdrawal means of the air-lift type has the advantage that a large volume of liquid can be conveyed by feeding a small volume of air. That is, when air having a very low density is blown into the air-lift pipe, the apparent density of the supernatant liquid within the pipe is reduced as compared with the slurry outside the pipe. This difference in density creates a driving force, by which the liquid within the pipe is propelled as if it were pushed up, and released from the tip of the pipe.

As another supernatant liquid withdrawal means, there may be used a simple withdrawal pipe (for example, provided with a suction pump).

According to a second aspect of the present invention, there is provided an absorption tower for use in wet flue gas desulfurization systems wherein a calcium compound slurry stored in a slurry tank installed at the bottom of the absorption tower is sprayed in the absorption tower and thereby brought into contact with flue gas so as to cause sulfur oxides contained in the flue gas to be absorbed in the slurry, and air is then blown into the slurry within the slurry tank to oxidize the calcium sulfite formed by the absorption of sulfur oxides and thereby produce a slurry containing gypsum, the absorption tower being equipped with a slurry thickening tank comprising a tank body disposed below the surface of the slurry within the slurry tank, a slurry inlet provided in the upper part of the tank body, a thickened slurry outlet provided in the lower part of the tank body, and supernatant liquid withdrawal means provided in the upper part of the tank body, whereby the slurry introduced into the tank body through the slurry inlet is thickened by sedimentation in the tank body and the resulting thickened slurry is discharged from the tank body through the slurry outlet, wherein the surface of the structural member of the tank body extending from the slurry inlet to the thickened slurry outlet has an angle of inclination greater than the angle of repose for the thickened slurry.

The absorption tower for use in flue gas desulfurization systems in accordance with the present invention is equipped with a slurry thickening tank of the sedimentation thickening type. Accordingly, the slurry can be primarily thickened in the absorption tower and then discharged from the absorption tower as a thickened gypsum slurry. This makes it possible to simplify subsequent slurry thickening and gypsum dehydration steps.

DETAILED DESCRIPTION OF PREFERRED EMBODIMENTS

Some embodiments of the present invention are more specifically described hereinbelow.

EXAMPLE 1

Figure 1:
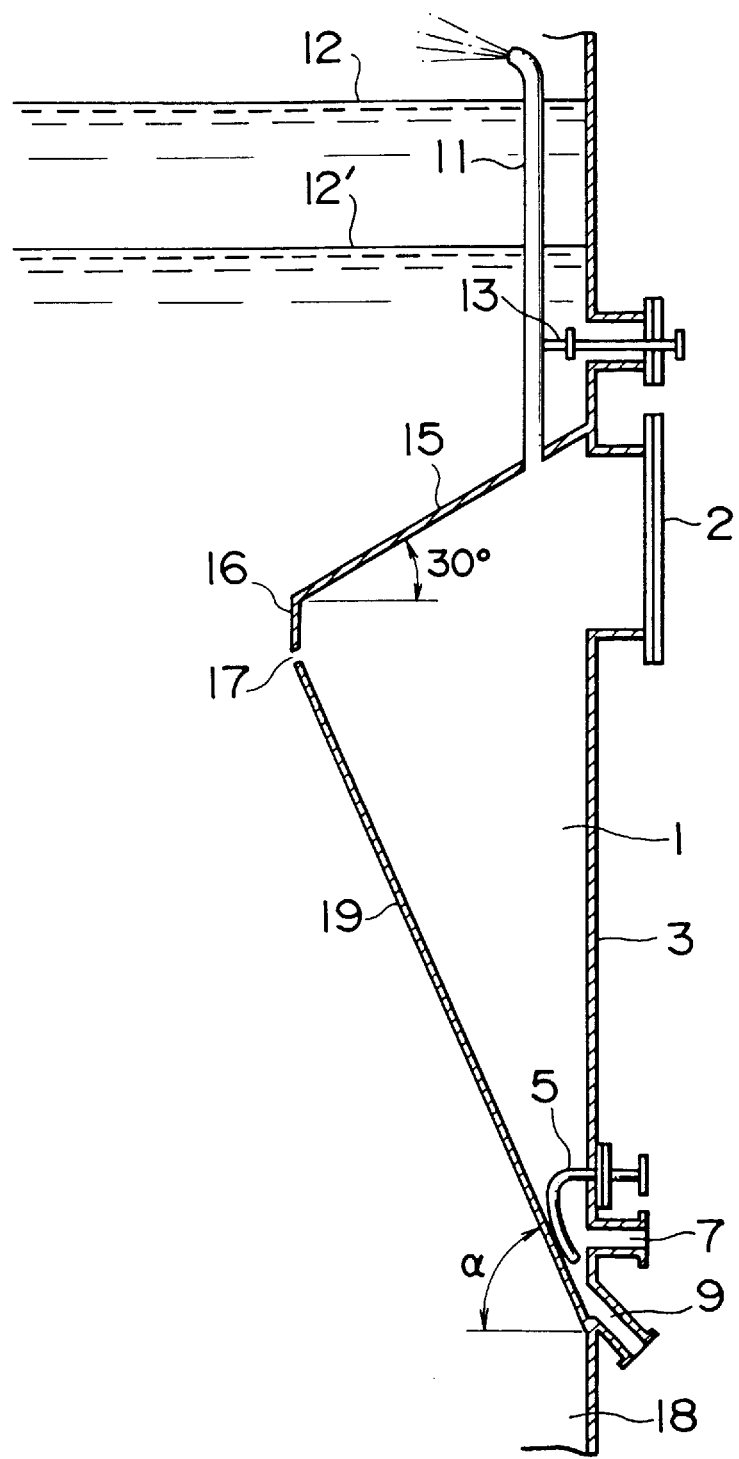
FIG. 1 is a sectional side view illustrating the construction of a slurry thickening tank in accordance with one embodiment of the present invention.
Figure 2:
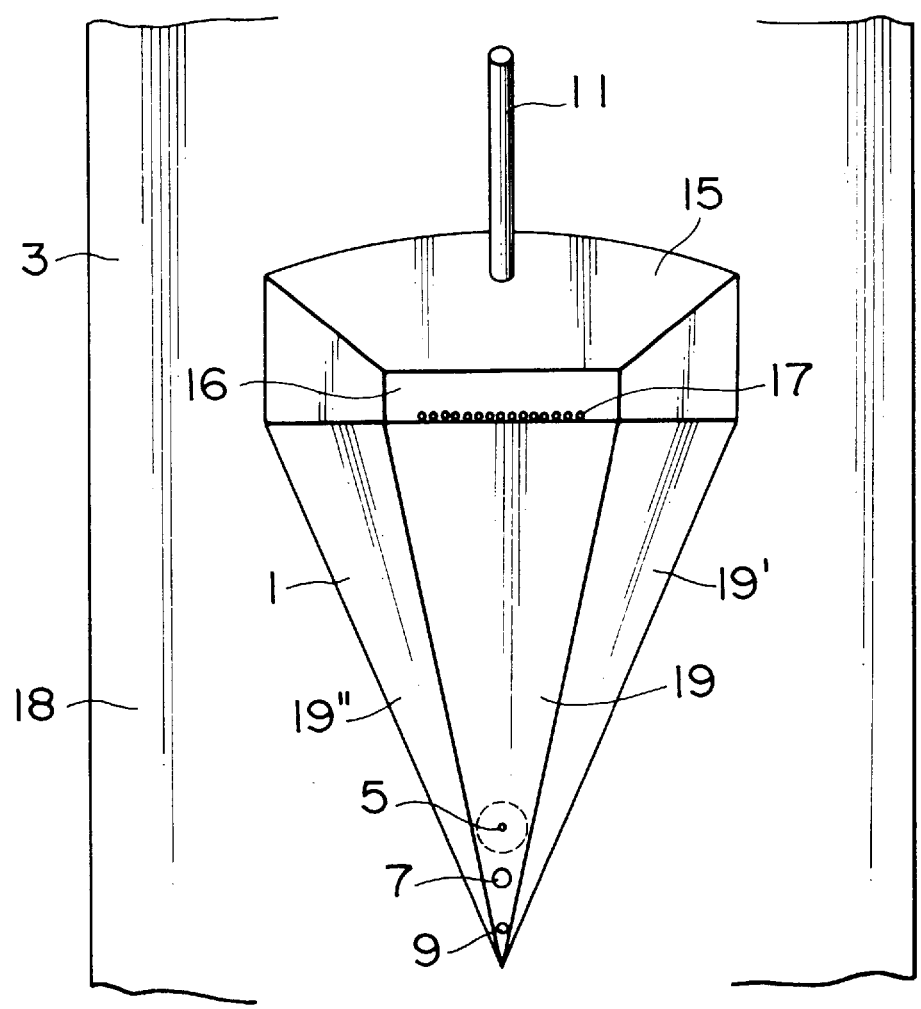
FIG. 2 is a schematic front view of the slurry thickening tank of FIG. 1 as seen from the inside of the slurry storage tank.

FIG. 1 is a sectional side view illustrating the construction of a slurry thickening tank in accordance with one example of the present invention, and FIG. 2 is a front view of the slurry thickening tank of FIG. 1 as seen from the inside of the slurry storage tank. Similarly to the conventional gypsum slurry thickening tank illustrated in FIG. 3, the slurry thickening tank 1 illustrated in these figures is attached to the inside of the shell of a slurry storage tank 18 included in an absorption tower for use in flue gas desulfurization systems.

The tank body of the slurry thickening tank 1 comprises the shell 3 of the slurry storage tank 18, a top plate 15, a side plate 19 and the like. The interior of the slurry thickening tank 1 basically defines a closed space, so that the slurry introduced into the slurry thickening tank 1 is allowed to remain still without being agitated or circulated vigorously. The top plate 15 of the tank body is inclined downward toward the interior of the slurry storage tank 18 (at 30° in the illustrated embodiment). This serves to prevent a mass of gypsum from accumulating on the top plate 15. Accordingly, its angle of inclination is chosen so as to be suitable for this purpose.

A slurry inlet forming plate 16 extends from the lower end of the top plate 15. This slurry inlet forming plate 16 is in an upright position and, as more clearly shown in FIG. 2, provided with a plurality of slurry inlets 17. Through these slurry inlets 17, the slurry flows from the slurry storage tank 18 into the slurry thickening tank 1. Since the slurry inlets 17 comprise relatively small holes (e.g., 15 holes having a diameter of 25 mm and arranged with a pitch of 45 mm), the slurry is restrained from going in or out owing to a disturbance of flow caused by air blowing into the slurry thickening tank 1 and, therefore, the slurry within the slurry thickening tank 1 is not agitated. Instead of the plurality of separate round holes, a slurry inlet 17 comprising a continuous slit may be used. The reason why the slurry inlet forming plate 16 is in an upright position is as stated before.

A slurry thickening tank side plate 19 is disposed under the slurry inlet forming plate 16. This side plate 19 extends straightly and slantingly from the lower ends of the slurry inlets 17 to a thickened slurry outlet 9. In this example, the angle of inclination ($\alpha$ in FIG. 1) of the side plate 19 is 60°. It is one of the features of the present invention that this angle a should be greater than the angle of repose for the thickened slurry. So far as a gypsum slurry present in a flue gas desulfurization system is concerned, the angle of repose for a thickened slurry having a gypsum content of 60% by weight is about 40° and, therefore, the angle $\alpha$ should preferably be greater than 40°. Then, the thickened slurry slips down between the shell 3 and the side plate 19 without stagnation and is discharged from the slurry thickening tank 1 through the thickened slurry outlet 9.

In the example illustrated in FIG. 2, side plates 19' and 19" are disposed on both sides of the central side plate 19.

Next, the construction of the lower part of the slurry thickening tank 1 is explained. The thickened slurry outlet 9 consists of a short pipe attached to the shell 3 so as to be inclined downward (at an angle of 45° in this example). As described above, this outlet 9 serves to discharge the thickened slurry. The purpose of its downward inclination is to prevent the outlet 9 from being blocked by stagnation of the thickened slurry.

A flushing pipe 7 provided above the thickened slurry outlet 9 serves to pour the unthickened slurry into the lower part of the slurry thickening tank 1 and thereby flush (or wash) it. For example, when the operation of the absorption tower of the flue gas desulfurization system is stopped for purposes of inspection or the like, the lower part of the slurry thickening tank 1 may be filled with the thickened slurry (or an accumulated mass of gypsum). Otherwise, the same part may be blocked up from some cause. In such cases, this flushing pipe 7 can be used to remove the blockage.

A recycle tube 5 provided above the flushing pipe 7 is also a means for preventing the thickened slurry outlet 9 and the lower part of the slurry thickening tank 1 from being blocked up. That is, during shut-down of the flue gas desulfurization system or during operation under a substantially low load, the rate of discharge from the thickened slurry outlet 9 is reduced, resulting in stagnation of the thickened slurry in the neighborhood of the thickened slurry outlet 9. In such a case, the slurry is continuously poured from this recycle tube 5 into the outlet 9 to circulate the slurry and thereby prevent the outlet 9 from being blocked up.

Next, the construction of the upper part of the slurry thickening tank 1 is explained. A manhole 2 provided in the upper part of the shell 3 of the storage tank is one for maintenance purposes. An air-lift pipe 11 is stood on the upper part of the top plate 15. The upper end of the air-lift pipe 11 is open to a space above the surface 12 of the slurry within the slurry storage tank 18. The height of the surface 12 of the slurry varies according to the presence or absence of air blowing which serves as a means for oxidizing the slurry within the absorption tower. In this figure, the surface of the slurry is designated by numeral 12 in the presence of air blowing and by numeral 12' in the absence of air blowing.

At a distance of about one-third the length of the air-lift pipe 11 as measured from the lower end thereof, an air blowing pipe (or gas stream forming means) 13 is connected to the air-lift pipe 11 so as to be inserted into the wall thereof. The air blown into the air-lift pipe 11 through this air blowing pipe 13 produces an upward stream of air. The air-lift effect exerted by this upward stream has been described previously. Instead of this air-lift mechanism, a supernatant liquid withdrawal pipe may be provided, for example, at the upper end of the manhole 2 in order to draw out the supernatant liquid by the action of natural head or pump suction head. In the slurry thickening tank 1 of this example, the air-lift pipe 11 comprises a 60A pipe and the air blowing pipe 13 comprises a 10A pipe, where 60A and 10A are expressed in nominal diameter.

Using the conditions shown in Table 1, an apparatus (of the construction illustrated in FIG. 1) in accordance with the above-described example was operated by way of experiment. As a result, a thickened slurry having a gypsum concentration of 60% by weight could be obtained successfully.

TABLE 1

Gypsum concentration in the slurry storage tank: 30% by weight.

Capacity of the slurry storage tank: 35 m³.

Dimensions and other conditions of the slurry thickening tank: Height, about 2.5 m; width, about 1.9 m; maximum thickness, about 1 m; height of the slanting part, about 2.1 m; angle of inclination of the side plate ($\alpha$ in FIG. 1), 65°; angle of inclination of the top plate, 30°; slurry inlets, 15 holes having a diameter of 25 mm.

Air-lift pipe: 10A pipe; height, about 1.3 m.

Rate of discharge of the thickened slurry: 0.8 m³/hr.

Pressure of air fed to the air-lift pipe: 0.3 kg/cm².

Flow rate of air fed to the air-lift pipe: 0–20 m³N/hr.

EXAMPLE 2

Figure 5:
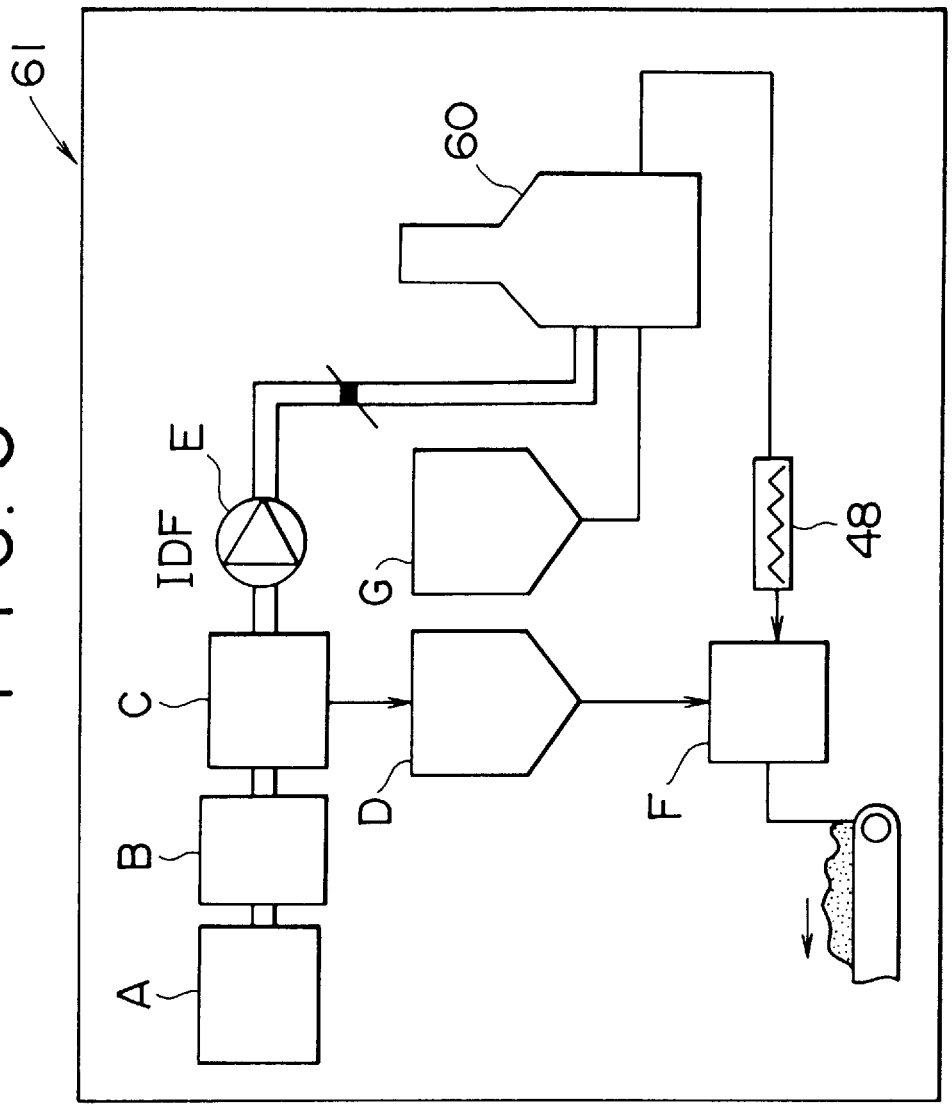
FIG. 5 is a simplified flow sheet illustrating an exemplary flue gas desulfurization system incorporating the absorption tower of the present invention.
Figure 6:
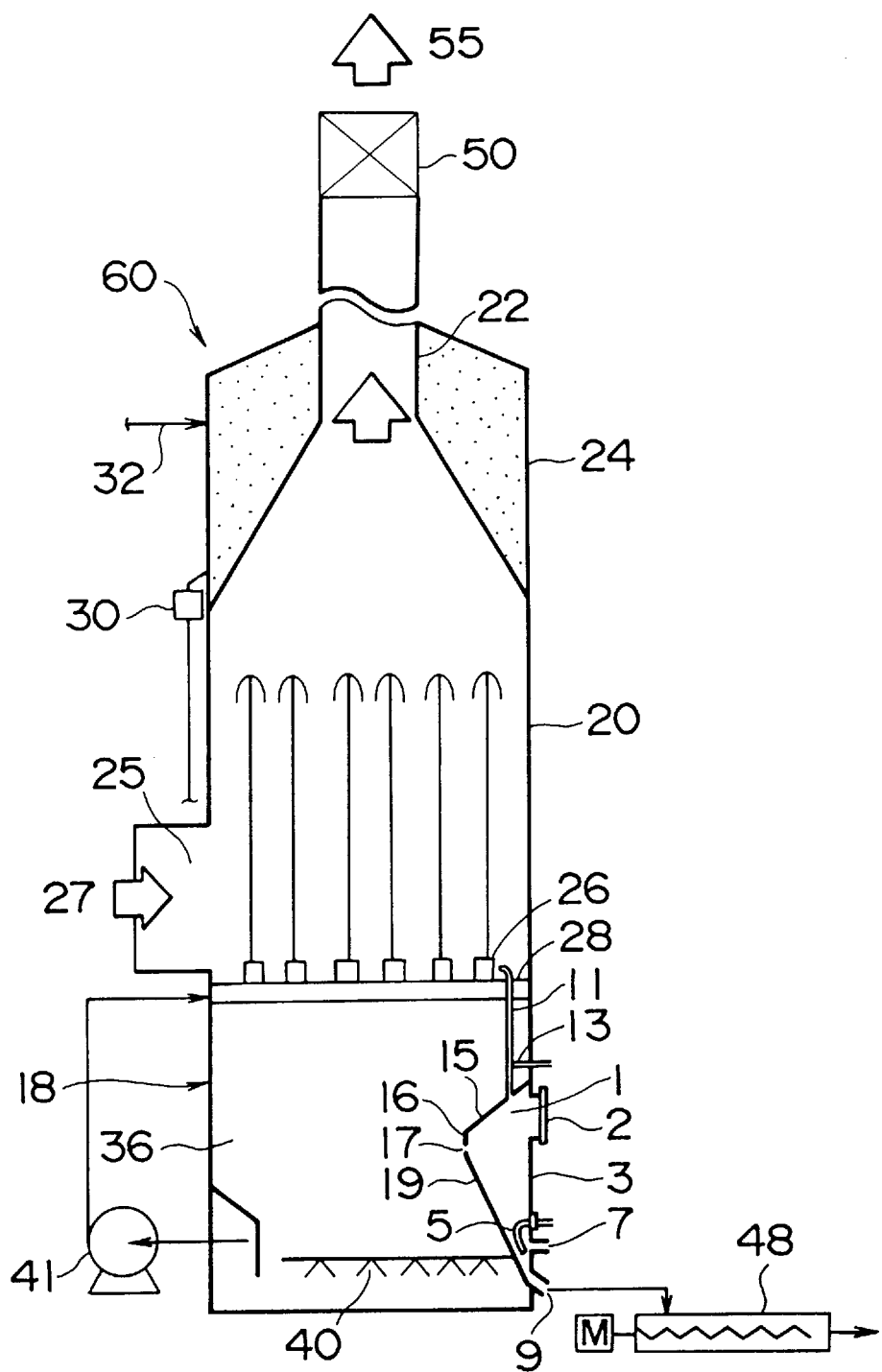
FIG. 6 is a schematic sectional view illustrating the construction of an absorption tower for use in flue gas desulfurization systems in accordance with one embodiment of the present invention.

FIG. 5 is a simplified flow sheet illustrating an exemplary wet flue gas desulfurization system incorporating the absorption tower of the present invention, and FIG. 6 is a schematic sectional view illustrating the construction of the absorption tower.

The wet flue gas desulfurization system (hereinafter referred to simply as the system) 61 of this example is a system for removing $SO_2$ gas contained in flue gas according to the lime-gypsum process using limestone as the absorbent, and includes an absorption tower 60, a mixer F for mixing the thickened gypsum slurry with coal ash, and a limestone storage tank G.

Flue gas produced in a coal-fired steam generator A of a thermal electric power plant is sucked by an induced draft fan (IDF) E and introduced into the absorption tower 60 by way of an air preheater B and an electrostatic precipitator C. More specifically, flue gas leaving the steam generator A passes through the air preheater B where it is cooled while heating combustion air, and then enters the electrostatic precipitator C. In the electrostatic precipitator C, dust such as coal ash is separated and removed from the flue gas and collected in the underlying coal ash storage tank D. On the other hand, the flue gas is sucked by the induced draft fan E and introduced into the absorption tower 60.

Figure 3:
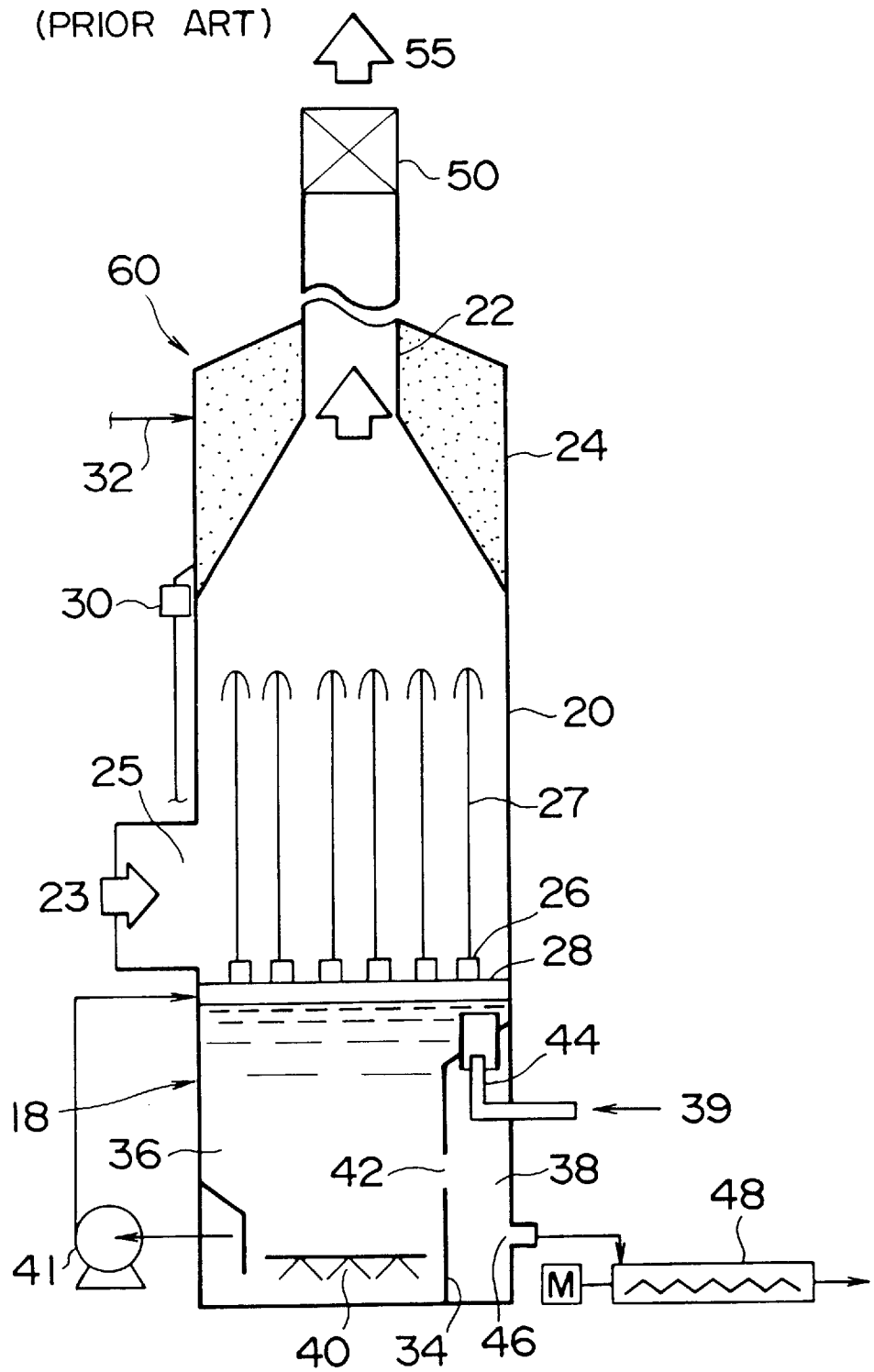
FIG. 3 is a schematic sectional view illustrating the construction of the absorption tower for use in flue gas desulfurization systems which is described in Japanese Patent Provisional Publication No. 7-308539/1995.
Figure 4:
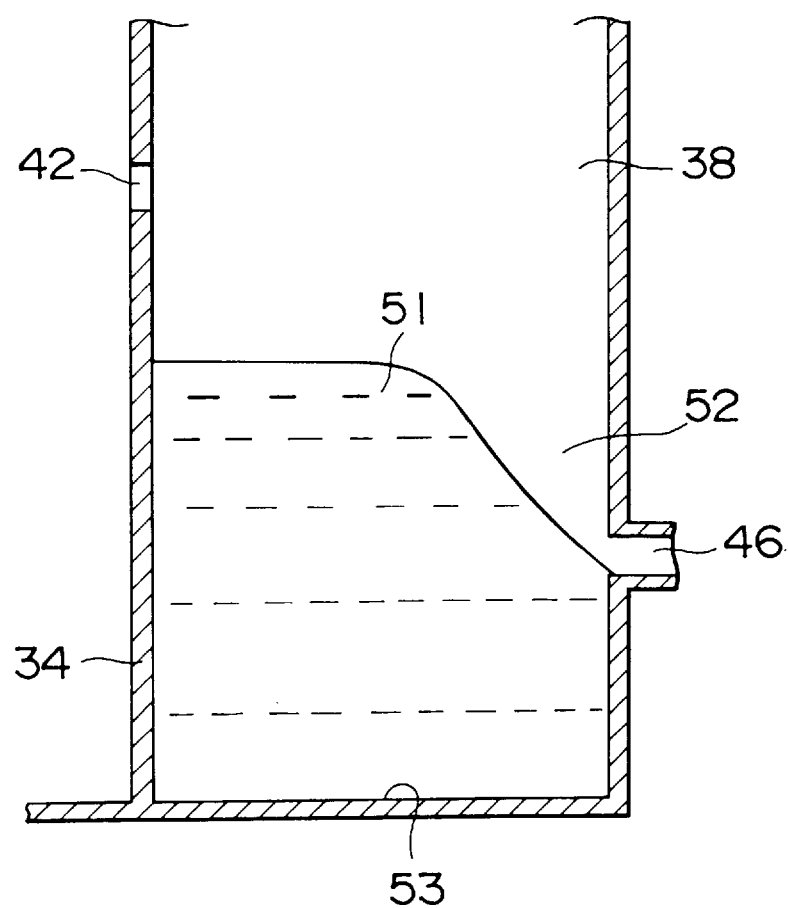
FIG. 4 is a diagrammatic view showing the situation which causes a trouble concerning the blockage of the thickened slurry outlet by an accumulated mass of gypsum to occur in a conventional slurry thickening tank.

As illustrated in FIG. 6, the construction of the absorption tower 60 is the same as that of the prior art absorption tower illustrated in FIG. 3, except for the gypsum slurry thickening tank 38. The storage tank 18 of this absorption tower 60 is equipped with a gypsum slurry thickening tank having the same construction as illustrated in FIG. 1. The names and functions of the other parts in this absorption tower 60 are the same as described previously in connection with FIGS. 3 and 1, and no detailed explanation thereof is given herein. These same parts are designated by the same numerals.

As is evident from the above description, the slurry thickening tank of the present invention exhibits the following effects.

(1) Since the surface of the structural member of the tank body extending from the slurry inlet to the thickened slurry outlet is designed to have an angle of inclination greater than the angle of repose for the thickened slurry, the thickened slurry outlet can be prevented from being blocked up. This makes it possible to operate the slurry thickening tank continuously without any trouble.

(2) Since the slurry inlet of the slurry thickening tank comprises one or more holes or a slit made in an upright or overhanging wall member forming part of the tank body, the slurry inlet can be prevented from being blocked up. This also contributes to a smooth operation of the slurry thickening tank.

(3) Since the supernatant liquid withdrawal means comprises an air-lift mechanism composed of a pipeline extending from the upper part of the tank body to a space above the slurry tank, and gas stream forming means for producing an upward stream of gas in the pipeline, the amount of slurry introduced can be regulated by controlling the flow rate of air fed through the air blowing pipe. Thus, the concentration of the thickened slurry can be controlled easily.

Moreover, since the absorption tower for use in flue gas desulfurization systems in accordance with the present invention is equipped with a slurry thickening tank of the sedimentation thickening type, the slurry can be primarily thickened in the absorption tower and then discharged from the absorption tower as a thickened gypsum slurry. This makes it possible to simplify the slurry thickening and gypsum dehydration steps following the absorption tower. Thus, the present invention can provide a low-cost and space-saving absorption tower for use in flue gas desulfurization systems which is especially suitable for use in simplified flue gas desulfurization systems.

We claim:

1. A slurry thickening tank comprising a tank body disposed below a surface of a slurry within a slurry tank, a slurry inlet provided in an upper part of said tank body, a thickened slurry outlet provided in a lower part of said tank body, and supernatant liquid withdrawal means provided in an upper part of said tank body, whereby the slurry introduced into said tank body through said slurry inlet is thickened by sedimentation in said tank body and a resulting thickened slurry is discharged from said tank body through said slurry outlet, wherein a surface of the structural member of said tank body extending from said slurry inlet to said thickened slurry outlet has an angle of inclination greater than an angle of repose for the thickened slurry.

2. A slurry thickening tank as claimed in claim 1 wherein said slurry inlet comprises one or more holes or a slit made in an upright or overhanging wall forming part of said tank body.

3. A slurry thickening tank as claimed in claim 1 or 2 wherein said supernatant liquid withdrawal means comprises an air-lift mechanism composed of a pipeline extending from an upper part of said tank body to a space above said slurry tank, and gas stream forming means for producing an upward stream of gas in said pipeline.

4. An absorption tower for use in wet flue gas desulfurization systems wherein a calcium compound slurry stored in a slurry tank installed at a bottom of said absorption tower is sprayed in said absorption tower and thereby brought into contact with flue gas so as to cause sulfur oxides contained in the flue gas to be absorbed in the slurry, and air is then blown into the slurry within said slurry tank to oxidize calcium sulfite formed by the absorption of sulfur oxides and thereby produce a slurry containing gypsum, said absorption tower being equipped with a slurry thickening tank comprising a tank body disposed below a surface of the slurry within said slurry tank, a slurry inlet provided in an upper part of said tank body, a thickened slurry outlet provided in a lower part of said tank body, and supernatant liquid withdrawal means provided in an upper part of said tank body, whereby the slurry introduced into said tank body through said slurry inlet is thickened by sedimentation in said tank body and a resulting thickened slurry is discharged from said tank body through said slurry outlet, wherein a surface of a structural member of said tank body extending from said slurry inlet to said thickened slurry outlet has an angle of inclination greater than an angle of repose for the thickened slurry.

5. An absorption tower for use in wet flue gas desulfurization systems as claimed in claim 4 wherein said slurry inlet in said slurry thickening tank comprises one or more holes or a slit made in an upright or overhanging wall forming part of said tank body.

6. An absorption tower for use in wet flue gas desulfurization systems as claimed in claim 4 or 5 wherein said supernatant liquid withdrawal means in said slurry thickening tank comprises an air-lift mechanism comprising a pipeline extending from an upper part of said tank body to a space above said slurry tank, and gas stream forming means for producing an upward stream of gas in said pipeline.

* * * * *

UNITED STATES PATENT AND TRADEMARK OFFICE
CERTIFICATE OF CORRECTION

PATENT NO.  : 5,770,166
DATED       : June 23, 1998
INVENTOR(S) : Shimizu et al.

It is certified that error appears in the above-identified patent and that said Letters Patent is hereby corrected as shown below:

On title page, item
[56] References Cited

FOREIGN PATENT DOCUMENTS

Line 1, delete "A 0 437 941" and insert --831,010-- therefor.

Line 4, delete "5/1995" and insert --11/1995-- therefor.

Signed and Sealed this

Seventh Day of September, 1999

Attest:

Q. TODD DICKINSON

Attesting Officer

Acting Commissioner of Patents and Trademarks